Feb. 20, 1968     F. BROUWER     3,369,301
PANTOGRAPH TYPE PATTERN CONTOUR TRACING SYSTEM
Filed Nov. 18, 1965     2 Sheets-Sheet 1

INVENTOR
Frans Brouwer.

By William J. Newman
Attorney

INVENTOR
Frans Brouwer.

By William J. Newman
Attorney

United States Patent Office 3,369,301
Patented Feb. 20, 1968

3,369,301
PANTOGRAPH TYPE PATTERN CONTOUR TRACING SYSTEM
Frans Brouwer, Glencoe, Ill., assignor to Stewart-Warner Corporation, Chicago, Ill., a corporation of Virginia
Filed Nov. 18, 1965, Ser. No. 508,481
8 Claims. (Cl. 33—23)

ABSTRACT OF THE DISCLOSURE

An automatic pattern tracing control system for pantograph supporting systems of the type having a linearly translatable carriage and a rotatable arm mounted on the carriage with a scanning head fixed to the free end of the arm. The scanning head develops a signal in accordance with deviations from the pattern and circuit means derives separate signals therefrom, a first signal for driving the carriage in linear direction and a second component for rotating the arm so as to maintain the scanning head on the line. Also disclosed is a second system for articulated type pantograph systems with signals being derived from the scanning head and circuit for separately driving each of the articulated arms.

---

This invention relates to pattern contour tracing systems and more particularly to pattern contour tracing systems which are useful for driving pantograph type machines in which the scanning head is fixed to a single or articulated double arm. In the case of the single arm type machine the arm is mounted for rotation about an axis fixed to a linearly translatable carriage, thus, providing universal motion of the scanning means with respect to the pattern. The other type machine has an articulated double arm with one arm journaled at one end for rotation about a fixed axis and the other arm journaled for rotation about an axis fixed with respect to the first arm.

Most of these machines are operated with the aid of a templet which frequently is in the form of a line or profile edge drawing and which is scanned by the scanning means to produce signals to control the propulsion of the scanning means along the contour.

Previous to this invention propulsion of these machines could only be obtained by constant speed drive wheels running on the pattern. Under certain conditions it is undesirable to use such a drive wheel such as when the machine is to be located in a dirty environment which could cause drive wheel slippage and other inaccuracies. In the present system drive means for the various components of the pantograph are provided electric signals to cause the scanning means to trace along the pattern contour at a desired constant velocity. The signals to the drive means are generated responsive to the deviation of the scanning means from the pattern contour and the position of the various elements of the pantograph.

In the signal arm pantograph type device, drive means are provided for the linearly translatable carriage and for the rotatable arm supporting the scanning means. Signals responsive to the position of the scanning means with respect to the pattern contour and the angular positions of the arm and carriage are provided to the respective drive means. In the articulated double arm pantograph type device drive means are provided for each of the arms and signals are provided thereto responsive to the position of the scanning means with respect to the pattern contour and the angular position of the arms with respect to a reference line.

It is therefore an object of this invention to provide unique means for tracing contour patterns with pantograph type machines.

It is also an object of this invention to provide a system for automatically tracing along a pattern contour at a constant velocity utilizing a pantograph type machine in which the scanning means is mounted on a rotatable arm journaled to a linearly translatable carriage.

It is also an object of this invention to provide a system for automatically tracing along a pattern contour utilizing a pantograph type machine in which the scanning means is mounted on an articulated double arm.

Another object of this invention is to provide means which may be attached to presently existing pantograph machines to enable automatically tracing along a pattern contour without utilizing a pattern engaging drive wheel.

Other objects and advantages of this invention will become apparent upon further study of the specification especially when taken in view of the accompanying drawings in which.

Single arm pantograph type

Figure 1:
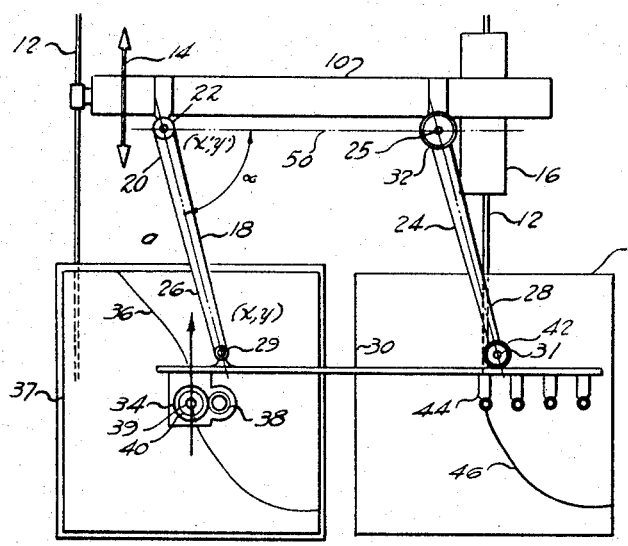
FIG. 1 is a plan view of a single arm type pantograph utilizing the teachings of this invention.

The single arm pantograph system shown in FIG. 1 includes a carriage 10 which is translatable along rails 12 in a direction indicated by arrows 14. Drive means 16 serve to translate the carriage 10 along the rails 12 and they may take the form of a rack and pinion driven by a conventional servo motor or any other suitable means.

The carriage 10 carries an arm 18 rotatable at its one end 20 about an axis 22 fixed with respect to the carriage 10. A second arm 24 of equal length with the arm 18 also rotatably fastened at 25 to the carriage 10. The two free ends 26, 28 of the arms 18 and 24, respectively, are pivotally connected at 29 and 31 to a crossbar 30 so that the assembly made up of carriage 10, arms 18 and 24 and crossbar 30 operates as a variable parallelogram. Drive means 32 are provided for rotating the arms 18 and 24 to vary the parallelogram. The drive means 32 may comprise an ordinary servo motor suitably geared to the arm 24 to rotate it about its axis responsive to electric signals in the motor. It is to be recognized, of course, that the drive motor 32 may be located at any one of the pivot points 22, 25, 29 or 31 to perform the function of rotating the arms and crossbar with respect to the carriage 10.

The crossbar 30 carries a scanning head 34 for viewing the pattern contour 36 on a drawing 37 and producing signals responsive to the relative position thereof. The scanning head may take the form for example of a line tracer such as shown in my aPtent No. 3,124,691, issued Mar. 10, 1964, or may take the form of an edge tracer such as shown in the copending application of Derek H. Redman, Ser. No. 144,287, filed Oct. 9, 1961. It is of course understood that many types of pattern contour scanners may be used, but the particular type of scanner used does not form a part of this invention.

A steering motor 38 is provided for rotating the scanner 34 about its own axis to steer it along the pattern contour 36. The motor 38 is operative responsive to the signals generated by the scanner as it traces along the line in accordance with the aforementioned patent and application.

A steering resolver 40 has its rotor (not shown) adapted to rotate with the scanner 34 to provide rectangular coordinate signals, the purpose of which will be hereinafter described. Another resolver 42 is provided with its rotor (not shown) adapted to rotate in accordance with the arm 28 to establish signals in accordance with the angular position of the arm 28 in a manner to be hereinafter described. The resolver 42 may also be located at any one of the pivot axes 22, 25, 29 or 31 which will be better understood after the later discussion of the geometry of the system.

The crossbar 30 also carries work tools 44 such as flame cutters, or the like. These tools follow a path parallel to the scanner 34 so as to make a cut 46 in a workpiece 48 similar to pattern contour. Any number of work tools 44 may be attached to the crossbar 30 for producing multiple cuts of the same pattern.

To develop the equations for the signals to energize the linear translation drive means 16 and the rotational drive means 32, the pivotal axis 22 is denoted by the coordinates $(X_1, Y_1)$ in a fixed coordinate system and the corresponding pivot 29 on the crossbar 30 is denoted by coordinates $(X, Y)$.

The position of point $(X, Y)$ in the fixed coordinate system may be defined by:

$$X = X_1 + a \cos \alpha$$
$$Y = Y_1 + a \sin \alpha$$

where $a$ is the length of the arm 18 and
$\alpha$ is the angle between the arm 18 and a reference line 50 normal to the direction 14 of the linear path.

The velocity equations may be found by differentiation of the above equations. Therefore:

$$V_x = -a \sin \alpha \frac{d\alpha}{dt}$$

and $$V_y = V_s + a \cos \alpha \frac{d\alpha}{dt}$$

where $V_s$ is the velocity of the carriage 10 along the rails 12.

Solving for the linear velocity of the carriage $V_s$ and the angular velocity of the arm 18

$$\frac{d\alpha}{dt} = \frac{V_x}{-a \sin \alpha}$$

or $$a \frac{d\alpha}{dt} = \frac{-V_x}{\sin \alpha}$$

and $$V_s = V_y + \frac{V_x}{\tan \alpha}$$

Figure 2:
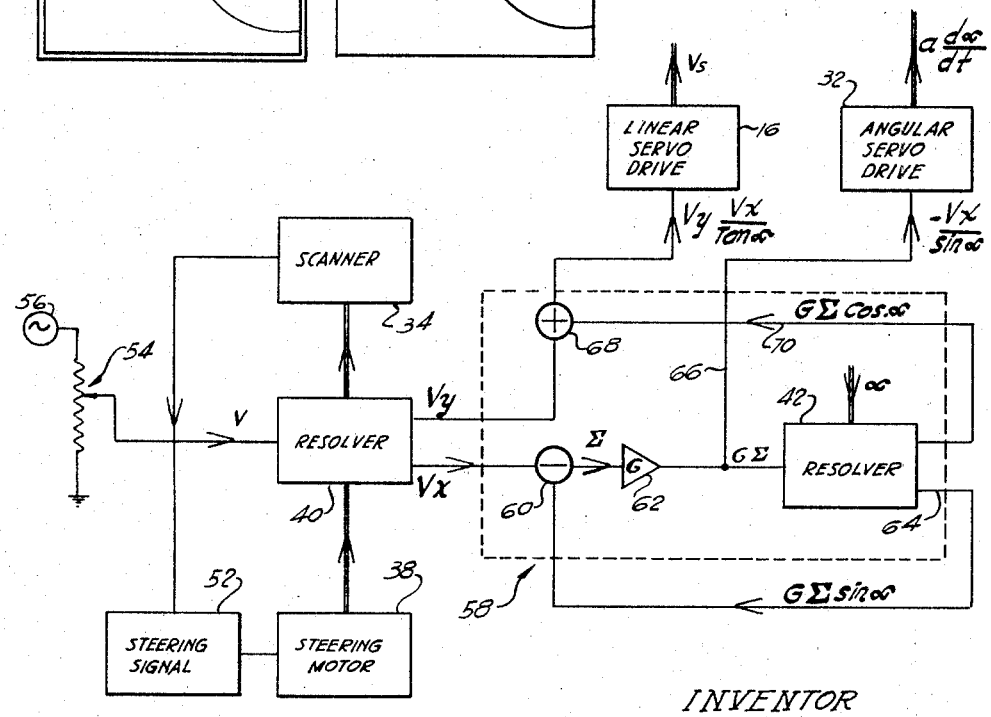
FIG. 2 is a block diagram of the electronic circuitry for the single arm pantograph system of FIG. 1.

FIG. 2 is a schematic block diagram of a circuit for providing the signals $$\frac{d\alpha}{dt} = \frac{-V_x}{a \sin \alpha}$$

and $$V_s = V_y + \frac{V_x}{\tan \alpha}$$

to the angular drive means 32 and the linear drive means 16, respectively. The scanner 34 viewing the pattern contour 36 generates a signal responsive to its position with respect to the pattern contour. Circuit 52 prepares the signal for motor 38 to steer the scanner into alignment with the pattern contour. Resolver 40 whose rotor is turned with the scanner 34 by the steering motor 38 develops rectangular coordinate signals $V_x$ and $V_y$ from a speed reference signal V obtained from a speed selection potentiometer 54 connected across an electric power source 56.

The rectangular coordinate signal $V_x$ is subjected to a division circuit 58 to derive the angular velocity signal $$\frac{V_x}{-\sin \alpha}$$

The division circuit 58 comprises a subtractor circuit 60 having one of its inputs in receipt of the rectangular coordinate signal $V_x$. The output of the subtractor 60 is amplified by a high gain amplifier 62 and conducted to the input of the resolver 42. Since the rotor of resolver 42 rotates with respect to the rotation of the arms 18, 24 of the pantograph it is a measure of the angle $\alpha$, hereinbefore defined, and the two outputs of the resolver are sine and cosine functions of the input thereto. The sin $\alpha$ component at output conductor 64 provides the other input to the subtractor 60.

The output of the high gain amplifier 62 provides, by means of conductor 66, a signal approximately equal to the angular velocity $$\frac{-V_x}{\sin \alpha}$$

in accordance with the following:

The equation for the output $\Sigma$ of the subtractor 60 is:

$$\Sigma = V_x - G\Sigma \sin \alpha$$

where G is the gain of the amplifier 62.
Transposing, $$V_x = \Sigma + G\Sigma \sin \alpha$$

$$\Sigma = \frac{V_x}{1 + G \sin \alpha}$$

and $$G\Sigma = \frac{V_x}{1/G + \sin \alpha}$$

But if the gain of amplifier 62 is very high, $$G\Sigma \cong \frac{V_x}{\sin \alpha} \cong -a \frac{d\alpha}{dt}$$

which is proportional to the desired angular velocity of the arms 18, 24 for movement of the scanner 34 along the pattern contour at the constant velocity V.

The rectangular coordinate signal $V_y$ is fed to one input of an adder circuit 68, the output of which provides a signal to the drive motor 16 for the linearly translatable carriage 10. The other input to the adder 68 is provided by conductor 70 from the other output of the resolver 42.

The other output of the resolver 42 at conductor 70 is approximately equal to $G\Sigma \cos \alpha$.

Substituting $$\frac{V_x}{\sin \alpha}$$

for $G\Sigma$ the signal applied to the other input of adder 68 is approximately equal to:

$$\frac{V_x}{\tan \alpha}$$

Therefore the output of adder 70 is approximately equal to:

$$V_y + \frac{V_x}{\tan \alpha} = V_s$$

which is proportional to the desired linear velocity of the carriage 10 along the rails 12 for movement of the scanner 34 along the pattern contour at the constant velocity V.

*Articulated two arm pantograph type*

Figure 3:
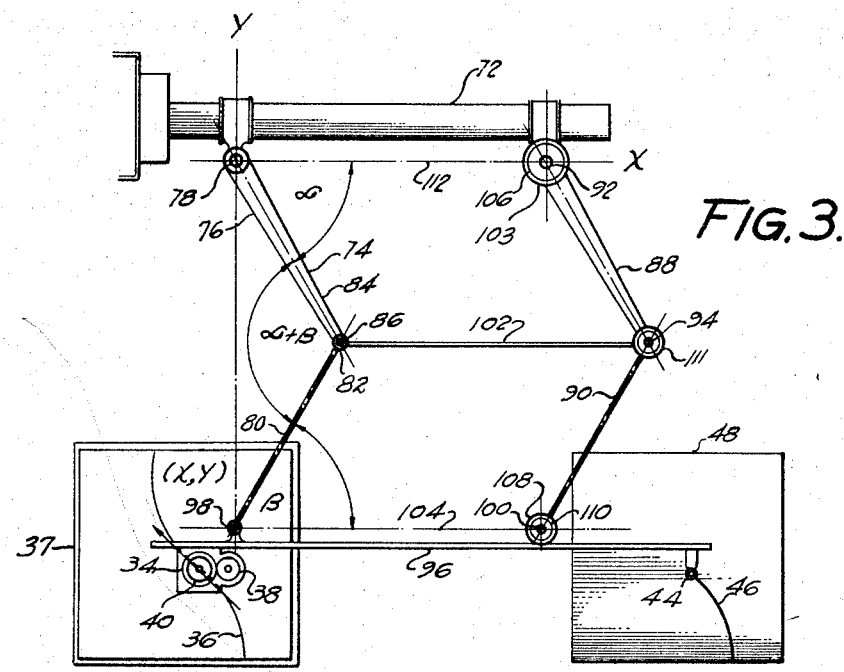
FIG. 3 is a plan view of an articulated two arm pantograph system.

The two arm articulated pantograph system shown in FIG. 3 comprises a support member 72 which is fixed with respect to the pattern contour 36 on drawing 37. The support member 72 carries a first arm 74 which is journaled at its one end 76 to the support member 72 for rotation about axis 78. A second arm 80 is journaled at its one end 82 to the free end 84 of arm 74 for rotation about axis 86. A similar arrangement of articulated arms 88 and 90 is provided with arm 88 journaled at axis 92 to the support member 72 and arm 20 journaled to arm 88 at axis 94.

A crossbar 96 interconnects the ends of the arms 80 and 90 at pivots 98 and 100 and a crossbar 102 interconnects the pivot points 86 and 94. The length of the cross arm 102 is equal to the distance between the pivot points 78, 92 and pivot points 98, 100 so that the crossbar 96 is capable of universal movement with respect to the support member 72 while maintaining itself parallel therewith.

The crossbar 96 carries a scanning head 34 for tracing along the pattern contour 36, a steering motor 38 and a resolver 40 in similar manner to that described for the single arm system of FIG. 1. Work tools 44 are also carried by the crossbar 96 to produce a cut 46 in the workpiece 48 in accordance with the pattern contour being traced.

A motor 103 drives the arm 88 for rotation about axis 92 and resolver means 106 has its rotor interconnected therewith to revolve with the arm 88. A second motor 103 drives the arm 90 for rotation about axis 100 and hence with respect to the arm 88. Another resolver means 110 is arranged so that its rotor revolves with respect to the rotation of arm 90 about axis 100. A third resolver is located at axis 94 and arranged so that its rotor revolves as arm 90 rotates with respect to arm 88. It is to be understood that the motors and resolvers may be located at other axes in the system to provide similar operation of the system.

For developing the velocity equations of this system the axis 78 will be considered the origin of a rectangular coordinate system. The fixed point on the crossbar 96 represented by axis 98 is of interest and is denoted by coordinate (X, Y). The point (X, Y) may be positionally described by the equations:

$$X = a \cos \alpha - b \cos \beta$$
$$Y = a \sin \alpha + b \sin \beta$$

where $\alpha$ is the angle between arm 74 and reference line 112, $\beta$ is the angle between arm 80 and reference line 104 which is parallel to line 112, $a$ is the length of arm 74 and $b$ is the length of arm 80.

Differentiating the above to determine the velocity equations and solving for the angular velocities it may be shown that:

$$\frac{d\alpha}{dt} = \frac{-V_x \cos \beta}{a \sin (\alpha+b)} + \frac{V_y \sin \beta}{a \sin (\alpha+\beta)}$$

and $$\frac{d\beta}{dt} = \frac{V_x \cos \alpha}{b \sin (\alpha+\beta)} + \frac{V_y \sin \alpha}{b \sin (\alpha+\beta)}$$

where $V_x$ is the velocity component of the desired constant velocity V along a direction parallel to reference line 112 and $V_y$ is the velocity component of constant velocity V along a direction normal to reference line 112.

Figure 4:
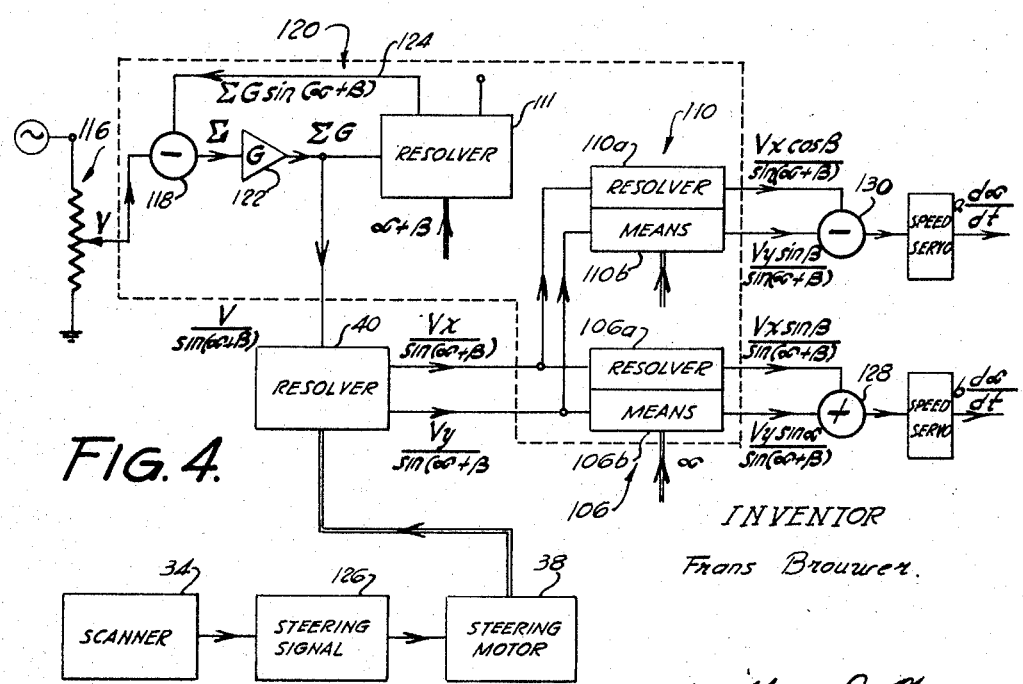
FIG. 4 is a schematic block diagram of the electronic circuitry for the articulated two arm pantograph of FIG. 3.

The system of FIG. 4 derives signals proportional to the above expressions for energizing motors 104 and 108 to drive the respective arms 74, 88 and 80, 90 causing the scanner 34 to travel along the pattern contour 36 at the desired constant velocity V. The constant velocity signal V is taken from potentiometer 116 and introduced to one input of a subtractor circuit 118 in a division circuit 120. High gain amplifier 122 amplifies the output of subtractor 118 and feeds its output to the input of resolver 111. The resolver 111 being located at the pivot axis 94 resolves the incoming signal into $\sin (\alpha+\beta)$ and $\cos (\alpha+\beta)$ functions because the angle between the two articulated arms 74, 80 or 88, 90 is equal to the sum of angles $\alpha$ and $\beta$. Only the $\sin (\alpha+\beta)$ component is of interest in the division circuit 120 and conductor 124 returns the signal to the second input of subtractor 118. The output of the high gain amplifier 122 is therefore approximately equal to $$\frac{V}{\sin (\alpha+\beta)}$$

in accordance with the derivation of the similar division circuit 58 of FIG. 2.

The signal $$\frac{V}{\sin (\alpha+\beta)}$$

is converted to rectangular coordinate components by resolver 40. The scanner 34, steering signal circuit 126 and steering motor 38 angularly position the rotor of resolver 40 in accordance with the direction of the pattern contour at the point being scanned so that the resolver input is broken up into components along the X and Y direction and these equal $$\frac{V_x}{\sin (\alpha+\beta)}$$

and $$\frac{V_y}{\sin (\alpha+\beta)}$$

respectively.

These two signals are in turn fed to resolver means 106 and 110 associated respectively with angle $\alpha$ and angle $\beta$ respectively. The resolver means 106 may comprise two resolvers 106a and 106b both of which are responsive to the angle $\alpha$. The X coordinate signal from resolver 40 may thus be resolved by resolver 106a into signal $$\frac{V_x \cos \alpha}{\sin (\alpha+\beta)}$$

and the Y coordinate signal from resolver 40 may be resolver by resolver 106b into a signal $$\frac{V_y \sin \alpha}{\sin (\alpha+\beta)}$$

These signals are combined in an adder circuit 128 to provide a signal which is approximately proportional to the angular velocity $d\beta/dt$ for arms 80, 108 or:

$$\frac{V_x \cos \alpha}{\sin (\alpha+\beta)} + \frac{V_y \sin}{\sin (\alpha+\beta)} = b\frac{d\beta}{dt}$$

Resolver 110a resolves the X coordinate output of resolver 40 into a signal $$\frac{V_x \cos \beta}{\sin (\alpha+\beta)}$$

and resolver 110b resolves the Y coordinate output of resolver 40 into a signal $$\frac{V_y \sin \beta}{\sin (\alpha+\beta)}$$

The difference of these two signals derived in subtractor circuit 130 provides a signal approximately proportional to the desired angular velocity $d\alpha/dt$ of the arms 74, 88 or:

$$\frac{-V_x \cos \alpha}{\sin (\alpha+\beta)} + \frac{V_y \sin \alpha}{\sin (\alpha+\beta)} = a\frac{d\alpha}{dt}$$

In some existing articulated double arm pantograph systems the support member 72 is linearly translatable along the floor. This type of system may be converted to the single arm system such as shown in FIG. 1 by the provision of crossbars between pivots 78, 98 and between pivots 92 and 100. These added crossarms then act similar to arms 18, 24 of FIG. 1 with components selected and arranged in accordance with the equations of the system of FIGS. 1 and 2.

While two preferred embodiments of this invention have been shown and described in detail it is recognized that many modifications and additions may be made thereto without materially deviating from the teachings of this invention. It is therefore intended to be bound only by the scope of the appended claims.

What is claimed is:

1. A system for tracing along a pattern contour comprising scanning means for producing a signal responsive to the deviation of said scanning means from said pattern contour, a pantograph having arm means mounting said scanning means, means for driving said pantograph and means responsive to said deviation signal and the angular position of said pantograph arm means for energizing said driving means to cause said scanning means to move along said pattern contour.

2. The system of claim 1 wherein said pantograph is linearly and angularly movable.

3. The system of claim 1 wherein said pantograph comprises a linearly translatable carriage and an arm supported at one end for rotation about an axis fixed with respect to said carriage; wherein said driving means comprises means for driving said carriage along said linear path, means for rotating said arm about said axis and means providing a velocity signal; and said responsive means is responsive to said deviation signal, the angular position of said arm and said velocity for energizing said driving means to move said scanning means along said pattern contour.

4. A system for tracing along a pattern contour at a constant velocity V comprising a head for scanning the pattern contour, means for moving said scanning head along said pattern contour comprising means for translating said scanning head along a linear path and means including an arm for rotating said scanning head about an axis fixed with respect to said translating means at an angular velocity $d\alpha/dt$ where $\alpha$ is the angle defined by said arm and a normal to said linear path through said axis, means responsive to the deviation between said pattern contour and said scanning head for producing a first signal $V_y$ proportional to the component of said constant velocity V along the direction of said linear path and a second signal $V_x$ proportional to the component of said constant velocity V along a direction normal to said linear path, means for providing to said linear path translating means a signal proportional to the sum of said first signal $V_y$ and a signal approximately proportional to $$\frac{V_x}{\tan \alpha}$$

and means for providing to said rotating means an angular velocity signal approximately proportional to $$\frac{V_x}{\sin \alpha}$$

5. A system for tracing along a pattern contour at a constant velocity comprising means for scanning the pattern contour to produce a signal indicative of the transverse deviation of said scanning head from said pattern contour, means for moving said scanning means along said pattern contour comprising means for translating said scanning means along a linear path and means including an arm for rotating said scanning means about an axis fixed with respect to said translating means, means responsive to said transverse deviation signal for steering said scanning means toward said pattern contour, a resolver responsive to the alignment of said sensing means and a signal proportional to said constant velocity for producing a first output proportional to the component of said constant velocity along the direction of said linear path and a second output proportional to the component of said constant velocity along a direction normal to said linear path, a subtractor having one input connected to said first output of said resolver, a high gain amplifier for amplifying the output of said subtractor, a second resolver connected to the output of said amplifier and responsive to the angle between said arm and a normal to the direction of said linear path for providing sine and cosine components of the output of said amplifier, means providing the sine component to the other input of said subtractor, means connecting the output of said amplifier to said rotating means, an adder having one input connected to the second output of the first resolver, means providing the cosine component of said second resolver to the other input of said adder, and means connecting the output of said adder to said linear translating means.

6. The system of claim 1 wherein said pantograph comprises two articulated arms.

7. The system of claim 1 wherein said pantograph comprises a first arm supported at one end for rotation about a first axis and a second arm supported at one end to the other end of said first arm for rotation about a second axis and supporting said scanning head at its other end; said driving means comprises means for rotating said first arm at an angular velocity $d\alpha/dt$ where $\alpha$ is the angle between said arm and a reference line through said first axis and means for rotating said second arm about said second axis at an angular velocity $d\beta/dt$ where $\beta$ is the angle between said second arm and a line parallel to said first reference line; and said responsive means comprises means for producing a first signal proportional to $$\frac{V}{\sin(\alpha+\beta)}$$

means responsive to the deviation of said scanning head from said pattern line and said first signal for producing a second signal $$\frac{V_x}{\sin(\alpha+\beta)}$$

where $V_x$ is proportional to the component of the constant velocity along the direction of said reference line and for producing a third signal $$\frac{V_y}{\sin(\alpha+\beta)}$$

where $V_y$ is proportional to the component of the constant velocity V normal to said reference line, means responsive to said second and third signals for providing to said first arm rotating means an angular velocity signal approximately proportional to $$\frac{V_y \sin \beta}{\sin(\alpha+\beta)} - \frac{V_x \cos \beta}{\sin(\alpha+\beta)}$$

and means responsive to said second and third signals for providing to said second arm rotating means a signal approximately proportional to $$\frac{V_y \sin \alpha}{\sin(\alpha+\beta)} + \frac{V_x \cos \alpha}{\sin(\alpha+\beta)}$$

8. A system for tracing along a pattern contour at a constant velocity V comprising means having a front-to-back axis for scanning the pattern contour to produce a signal indicative of the transverse deviation of said front-to-back axis from said pattern contour, a first arm supported at one end for rotation about a first axis, a second arm supported at one end to the other end of said first arm for rotation about a second axis and supporting said scanning head at its other end, means for rotating said first arm about said first axis, means for rotating said second arm about said second axis, a subtractor having a signal proportional to said constant velocity V at one of its inputs, a high gain amplifier for amplifying the output of said subtractor, a first resolver connected to the output of said amplifier and responsive to the angle between said two arms for providing a sine component of the output of said amplifier, means providing said sine component to the other input of said subtractor, means connecting the output of said amplifier to one input of a second resolver, means responsive to said angular deviation signal for steering said scanning means towards the pattern contour, said second resolver responsive to the angular alignment of said scanning means and said amplifier output for providing sine and cosine components of said amplifier output, resolver means responsive to the angle between said first arm and a reference line for producing a sine component of said amplifier output cosine component and a cosine component of said amplifier output sine component, means for adding the last mentioned sine component and cosine component to provide a sum signal, means for providing said sum signal to said second arm rotating means, resolver means responsive to the angle between said second arm and a reference line parallel to said first reference line for producing a sine component of the amplifier output cosine component and a cosine component of the amplifier output sine component, means for the last mentioned cosine component from the last mentioned sine component to provide a difference signal, and means for providing said difference signal to said first arm rotating means.

References Cited

UNITED STATES PATENTS

| | | | |
|---|---|---|---|
| 2,226,677 | 12/1940 | Vikhman | 33—23 X |
| 2,278,607 | 4/1942 | Anderson | 266—23 |
| 2,305,909 | 12/1942 | Stoneberg | 266—23 |
| 2,317,526 | 4/1943 | Hayes | 33—25 X |
| 2,933,612 | 4/1960 | Cheverton et al. | 250—202 |
| 2,988,643 | 6/1961 | Inaba | 250—202 |
| 3,069,550 | 12/1962 | Neander | 250—202 |

HARRY N. HAROIAN, *Primary Examiner.*